(12) United States Patent
Wang et al.

(10) Patent No.: US 11,339,994 B2
(45) Date of Patent: May 24, 2022

(54) CONTROL METHOD AND CONTROL DEVICE FOR VARIABLE-FREQUENCY AND VARIABLE-CAPACITY HEAT PUMP HOT-AIR DRYING SYSTEM

(71) Applicant: JIANGSU TENESUN ELECTRICAL APPLIANCE CO., LTD., Nantong (CN)

(72) Inventors: Yujun Wang, Nantong (CN); Yunyun Wu, Nantong (CN); Xiaowang Wu, Nantong (CN); Zhonghai Ji, Nantong (CN); Ying Wang, Nantong (CN); Tianshu Wang, Nantong (CN); Yi Yang, Nantong (CN)

(73) Assignee: JIANGSU TENESUN ELECTRICAL APPLIANCE CO., LTD., Nantong (CN)

(*) Notice: Subject to any disclaimer, the term of this patent is extended or adjusted under 35 U.S.C. 154(b) by 541 days.

(21) Appl. No.: 16/469,093

(22) PCT Filed: Jul. 20, 2017

(86) PCT No.: PCT/CN2017/093635
§ 371 (c)(1),
(2) Date: Jun. 12, 2019

(87) PCT Pub. No.: WO2018/107750
PCT Pub. Date: Jun. 21, 2018

(65) Prior Publication Data
US 2020/0072550 A1     Mar. 5, 2020

(30) Foreign Application Priority Data

Dec. 16, 2016   (CN) .......................... 201611170304.8
Dec. 16, 2016   (CN) .......................... 201621387050.0

(51) Int. Cl.
*F25B 6/02*      (2006.01)
*F25B 30/02*     (2006.01)
(Continued)

(52) U.S. Cl.
CPC ............... *F25B 6/02* (2013.01); *F25B 30/02* (2013.01); *F25B 41/22* (2021.01); *F26B 21/08* (2013.01);
(Continued)

(58) Field of Classification Search
CPC .... F26B 21/10; F26B 21/08; F25B 2600/027; F25B 41/40; F25B 30/02; F25B 2600/2519
(Continued)

(56) References Cited

U.S. PATENT DOCUMENTS 5,675,906 A * 10/1997 Li ........................... F26B 9/066
                                                            34/233
7,624,514 B2 * 12/2009 Konabe ................... F26B 3/205
                                                             34/90
(Continued)

FOREIGN PATENT DOCUMENTS

WO    WO-2018107750 A1 *  6/2018  ............. F25B 30/02

*Primary Examiner* — Stephen M Gravini
(74) *Attorney, Agent, or Firm* — CBM Patent Consulting, LLC

(57) ABSTRACT

A control method and control device for a heat pump-type double-circulation hot-air drying system, relating to a device for supplying or controlling air or gas for drying solid materials or products, and in particular to a control method and control device for a heat pump-type hot-air drying system. The method comprises: configuring a temperature control parameter, and saving a preset temperature control curve parameter; detecting and monitoring an outlet air temperature, and the temperature and humidity of a drying room; dynamically adjusting a set temperature according to
(Continued)

a preset temperature control curve; and selecting, according to a current set temperature, a double-circulation dynamic operation mode of a system. The control device uses a micro-processor to realize program control. By building an inner circulation loop for large-volume air circulation, the latent heat of condensation in a refrigerant is fully absorbed, to improve the basic air temperature.

4 Claims, 7 Drawing Sheets

(51) Int. Cl.
 *F26B 21/08* (2006.01)
 *F26B 21/10* (2006.01)
 *F25B 41/22* (2021.01)

(52) U.S. Cl.
 CPC ........ *F26B 21/10* (2013.01); *F25B 2600/027* (2013.01); *F25B 2600/2519* (2013.01)

(58) Field of Classification Search
 USPC .............................................. 34/73
 See application file for complete search history.

(56) References Cited

U.S. PATENT DOCUMENTS

| | | | | |
|---|---|---|---|---|
| 9,487,910 | B2* | 11/2016 | Huang | D06F 58/206 |
| 9,731,865 | B2* | 8/2017 | Heβ | D06F 58/20 |
| 9,834,882 | B2* | 12/2017 | Patil | D06F 58/206 |
| 10,662,575 | B2* | 5/2020 | Ahn | D06F 58/46 |
| 10,844,534 | B1* | 11/2020 | Brown | D06F 58/20 |
| 10,928,131 | B2* | 2/2021 | Krebs | F26B 23/005 |
| 10,988,895 | B2* | 4/2021 | Kim | D06F 58/26 |
| 11,028,526 | B2* | 6/2021 | Lee | H05K 7/1427 |
| 11,060,236 | B2* | 7/2021 | Djerekarov | D06F 58/30 |
| 2020/0072550 | A1* | 3/2020 | Wang | F25B 41/40 |
| 2021/0033304 | A1* | 2/2021 | Mueller | F24H 9/2085 |

* cited by examiner

CONTROL METHOD AND CONTROL DEVICE FOR VARIABLE-FREQUENCY AND VARIABLE-CAPACITY HEAT PUMP HOT-AIR DRYING SYSTEM

BACKGROUND OF THE INVENTION

1. Technical Field

The invention relates to a device for supplying or controlling air or gas for drying solid materials or products, in particular to a control method and control device for a heat pump-type hot-air drying system.

2. Description of Related Art

At present, hot-air drying is used on more and more occasions, such as tobacco drying, grain drying, medicinal material drying, and fruit and vegetable drying, and is realized mainly through coal furnaces, gas furnaces, or electric furnaces. Neither coal nor gas is a renewable strategic energy or is promoted nationally, and the electric furnaces are not suitable for massive popularization either due to their high energy consumption and high operating costs. Heat pumps are massively promoted nowadays in rural areas to replace traditional coal furnaces adopted in northern rural areas to supply heat by means of water heating, which proves that the heat pumps will have broad market prospects in heating. The heat pumps also have great development potential in the aspect of hot-air drying. For instance, tobacco curing equipment in China still adopts traditional civil-structured natural ventilation drying rooms, and in spite of certain improvements, such equipment still fails to break through the traditional form. Bulk curing equipment based on direct heat supply by fuel oil and fuel coal, as well as heat supply by boilers was introduced into China in the 1990s and reflected, after being experimentally and demonstratively used in many regions, the advantages of making curing operations easy and convenient, saving labor, and guaranteeing the tobacco curing quality. However, due to its high one-time investment cost and high oil consumption, such equipment can hardly be massively popularized in the near future and is not suitable for the national condition of China, thus, being unacceptable in production. A large quantity of heat will be consumed in the tobacco curing process. Common drying rooms using coal for direct heat supply are low in heat utilization rate and high in coal consumption (generally, 1.5-2.5 kg of standard coal is consumed for curing 1 kg of tobacco) and cause severe environmental pollution. Chinese Invention Patent "Tobacco Curing Barn Using Air Source as Heat Source" (Invention Patent No. 200910044468.X, Authorized Publication No. CN101940358B) discloses a tobacco curing barn using an air source as a heat source, wherein the tobacco curing barn comprises a heating room provided with a fresh air inlet, a drying room provided with temperature and humidity probes, an air source heat pump, and a condenser fan, wherein a moisture outlet is formed in an upper portion of the barn. The ratio of the heat exchange area of a condenser to the input power of a compressor is 7-15 $m^2/kw$, and the condenser and the induced draft fan of the condenser are arranged in a heating room; and the drying room and/or the heating room are/is provided with an insulation layer. In this technical solution, the air source heat pump and solar energy are used as a novel heat source of the tobacco curing barn, so that the application range of the air source heat pump and solar energy is greatly expanded; and massive application and popularization of this technical solution in tobacco-growing areas can reduce the sulfur content of the atmosphere, soil, and tobacco and improve the tobacco quality, and have positive significance in energy saving and environmental protection. As for tobacco curing, five-section, seven-section, and six-section dual-low curing processes are successively put forwards in different regions. According to each of the curing processes, the whole tobacco curing process is divided into a yellowing stage, a dyeing stage, and a stem-drying stage, and temperature and humidity indicators in each stage are clearly specified, wherein FIG. 9 shows a multi-section drying process diagram of tobacco of some varieties. Due to the complicated and detailed division of the curing processes, particularly the complicated, indistinct and non-quantitative division of tobacco changes, the lack of simple and explicit key points, and the complex techniques which are difficult to master, existing heat pump drying systems cannot meet the requirements of tobacco curing either.

In addition, due to the requirement for a hot outlet air temperature over 80° C. in certain high-temperature drying periods, another issue to be settled is how to realize high-temperature hot air supply of heat pump-type hot-air drying systems. Chinese Invention Patent "Ultrahigh-temperature Heat Pump Drying System" (Invention Patent Application No. 201510433292.2, Publication No. CN105021015A) discloses an ultrahigh-temperature heat pump drying system, which comprises a drying room, an air return channel communicated with an air supply port and an air return duct of the drying room, a circulating fan arranged in the air return channel, an exhaust channel communicated with the air return channel, an exhaust fan arranged at an opening of the exhaust channel, an air heat recovery device arranged at the junction of the air return channel and the exhaust channel, and at least two heat pump units used in parallel. In this invention, two or more heat pump units are adopted to work in parallel; in the initial stage of the drying process, low-grade ambient air heat is collected to increase the temperature of the drying room by heating; and after the temperature of the drying room is increased to a certain degree, high-temperature and high-humidity air exhausted out of the drying room is dehumidified, and sensible heat and latent heat in the air are recovered to the maximum extent. By means of the different temperature ranges of circulating media in the two heat pump units, the system can provide a higher supply air temperature, and meanwhile, the evaporating temperature of a drying unit is fully increased. However, this technical solution adopts two heat pump units, so that the equipment investment of the drying room is multiplied; and the different temperature ranges of circulating media are used to increase the supply air temperature, so that equipment maintenance becomes more complex. Meanwhile, a large variation of the heat demand of the drying room in the drying process leads to frequent starting and stopping of the heat pump units, the operation power consumption of the units is increased, the energy efficiency of the units is reduced, the temperature in the drying room varies drastically, and even the quality of finished products is affected due to the large variation of the drying temperature.

BRIEF SUMMARY OF THE INVENTION

The objective of the invention is to provide a heat pump-type double-circulation hot-air drying system to solve the technical problems caused when existing heat pump-type hot-air drying systems are used for supplying high-temperature hot air.

The technical solution adopted by the invention to fulfill this objective is as follows:

A control method for a heat pump-type double-circulation hot-air drying system is characterized by comprising the following steps:

S100: configuring a temperature control parameter, and saving a preset temperature control curve parameter;

S200: detecting and monitoring an outlet air temperature, and the temperature and humidity of a drying room;

S300: dynamically adjusting a set temperature according to a preset temperature control curve; and S400: selecting, according to a current set temperature, a double-circulation dynamic operation mode of a system.

The heat pump-type double-circulation hot-air drying system comprises a hot-air double-circulation loop, an air supply regulation valve, an inner circulation air valve, a latent heat condenser, a sensible heat condenser, and a double-path unloading branch, wherein the hot-air double-circulation loop is composed of an air supply circulation loop and an inner circulation loop; the air supply regulation valve and the inner circulation air valve are used for adjusting the circulation air volume of the hot-air double-circulation loop; the latent heat condenser and the sensible heat condenser are connected in series to a main circulation pipeline of a refrigerant; and the double-path unloading branch is formed by connection of an unloading electromagnetic valve, a first throttle valve and a second throttle valve.

The double-circulation dynamic operation mode includes a single-circulation conventional heating mode, a double-circulation pressure reduction and unloading mode, a double-circulation temperature reduction and unloading mode, and a double-circulation double-path unloading mode, wherein:

In the single-circulation conventional heating mode, the unloading electromagnetic valve is closed, and the refrigerant circulates along the main circulation pipeline; the inner circulation air valve is opened by 0%, the air supply regulation valve is opened by 100%, and the double-circulation hot-air drying system produces low-temperature hot air at an outlet air temperature below 45° C. by means of the air supply circulation loop; and a control device controls the outlet air temperature by changing an operation interval or operation frequency of a compressor.

In the double-circulation pressure reduction and unloading mode, the unloading electromagnetic valve and the second throttle valve are opened, the first throttle valve is closed, and part of the refrigerant is diverted by the unloading electromagnetic valve to directly enter a vapor-liquid separator via the second throttle valve while the refrigerant circulates along the main circulation pipeline; the inner circulation air valve is opened by 50%-55%, and the air supply regulation valve is opened by 50%-45%; and the control device adjusts the circulation air volumes of the air supply circulation loop and the inner circulation loop to control the outlet air temperature, so that medium-temperature hot air having an outlet air temperature of 45-65° C. is produced;

In the double-circulation temperature reduction and unloading mode, the unloading electromagnetic valve and the first throttle valve are opened, the second throttle valve is closed, and part of the refrigerant is diverted by the unloading electromagnetic valve to enter an evaporator via the first throttle valve in parallel connection with an expansion valve while the refrigerant circulates along the main circulation pipeline; the inner circulation air valve is opened by 55%-65%, and the air supply regulation valve is opened by 45%-35%; and the control devices adjusts the circulation air volumes of the air supply circulation loop and the inner circulation loop to control the outlet air temperature, so that medium high-temperature hot air having an outlet air temperature of 65-75° C. is produced;

In the double-circulation double-path unloading mode, the unloading electromagnetic valve, the first throttle valve and the second throttle valve are opened, and the refrigerant is diverted by the unloading electromagnetic valve while circulating along the main circulation pipeline, so that part of the refrigerant enters the evaporator via the first throttle valve in parallel connection with the expansion valve, and the other part of the refrigerant directly enters the vapor-liquid separator via the second throttle valve; the inner circulation air valve is opened by 65%-75%, and the air supply regulation valve is opened by 35%-25%; and the control device adjusts the circulation air volumes of the air supply circulation loop and the inner circulation loop to control the outlet air temperature, so that high-temperature hot air having an outlet air temperature over 75° C. is produced.

According to a preferred technical solution of the control method for the heat pump-type double-circulation hot-air drying system, S400 comprises the following control and operation steps:

S420: if the heat demand is less than 25%, starting a variable-frequency compressor, and closing a first electromagnetic valve group and a second electromagnetic valve group, so that the system enters into a variable-frequency and constant-capacity mode;

S440: if the heat demand is less than 35%, starting the variable-frequency compressor, closing the first electromagnetic valve group, and opening the second electromagnetic valve group, so that the system enters into a variable-frequency and variable-capacity mode;

S460: if the heat demand is greater than or equal to 70%, executing S480; or otherwise, synchronously starting a constant-frequency compressor and the variable-frequency compressor, opening the first electromagnetic valve group, and closing the second electromagnetic valve group, so that the system enters into a constant-frequency variable-capacity and variable-frequency constant-capacity parallel operation mode; and S480: synchronously starting the constant-frequency compressor and the variable-frequency compressor, closing the first electromagnetic valve group, and opening the second electromagnetic valve group, so that the system enters into a constant-frequency constant-capacity and variable-frequency variable-capacity parallel operation mode.

Another objective of the invention is to provide a control device for implementing the control method for the heat pump-type double-circulation hot-air drying system. The technical solution adopted by the invention to fulfill this objective is as follows.

The heat pump-type hot-air drying system control device for implementing the control method for the heat pump-type double-circulation hot-air drying system is characterized by comprising an operation parameter setting module, a drying room temperature and humidity monitoring module, a supply air temperature monitoring module, an air valve opening controller, and a heat pump unit controller, wherein the operation parameter setting module is used for configuring the temperature control parameter and saving the preset temperature control curve parameter; the drying room temperature and humidity monitoring module and the supply air temperature monitoring module are used for detecting and monitoring the temperature and humidity of the drying room, and the outlet air temperature; the air valve opening controller is used for driving the air valve; the heat pump unit controller is used for controlling the compressors and the electromagnetic valves; an input terminal of the drying room temperature and humidity monitoring module is connected to the operation parameter setting module, a dry bulb temperature sensor and a wet bulb temperature sensor; an output terminal of the drying room temperature and humidity monitoring module is connected to the heat pump unit controller; an output terminal of the heat pump unit controller is connected to the compressors and a control electromagnetic valve in a refrigerant pipeline; an input terminal of the supply air temperature monitoring module is connected to the operation parameter setting module and an outlet air temperature sensor; an output terminal of the supply air temperature monitoring module is connected to the air valve opening controller; and an output terminal of the air valve opening controller is connected to the inner circulation air valve and the air supply regulation valve.

According to a preferred technical solution of the heat pump-type hot-air drying system control device, the control device uses a single-chip micro-processor having a multi-path A/D conversion interface and a multi-path PWM output interface to realize program control, and the operation parameter setting module, the drying room temperature and humidity monitoring module and the supply air temperature monitoring module are functional software modules provided by the micro-processor; the dry bulb temperature sensor, the outlet air temperature sensor and the wet bulb temperature sensor are connected to the single-chip micro-processor via the A/D conversion interface of the micro-processor; the control device provides an air valve opening control output signal for the air valve opening controller by means of a PWM output of the micro-processor and provides an output signal for variable-frequency control of the variable-frequency compressor and a variable-frequency fan by means of the heat pump unit controller; and the control device outputs switch signals to the compressors and the electromagnetic valves by programming via a PIO interface of the micro-processor, and the heat pump unit controller controls the switch state of the compressors and the electromagnetic valves in the system.

The invention has the following beneficial effects:

1. According to the control method and control device for the heat pump-type double-circulation hot-air drying system, a micro-processor is used to realize program control; by building the inner circulation loop for large-volume air circulation, the latent heat of condensation in the refrigerant is fully absorbed, so as to improve the basic air temperature, and high-temperature hot air is produced by means of second heat exchange performed by the air supply circulation loop; automatic adjustment of a double-path air volume is used to control an outlet air volume to guarantee the change requirement of the outlet air temperature and the temperature in the drying room; and the reliability of a product can be ensured, and the purposes of improving the energy efficiency of a unit and reducing the energy consumption can be also achieved.

2. According to the control method and control device for the heat pump-type double-circulation hot-air drying system, a multi-section temperature control curve is used to configure a temperature control parameter of the drying room, a set temperature is dynamically adjusted according to a temperature control curve, the operation mode of the system is selected according to the current set temperature, and thus, the double-circulation hot-air drying system is controlled to realize fully-automatic intelligent operation without manual control; and the requirement for high-precision control over the temperature and humidity in the curing process can be met.

Reference signs of the components in the figures: 1, compressor; 1-1, constant-frequency compressor; 1-2, variable-frequency compressor; 2-1, first condenser; 2-2, second condenser; 2-3, third condenser; 21, latent heat condenser; 22, sensible heat condenser; 3, expansion valve; 3-1, first expansion valve; 3-1A, first balance pipe; 3-1B, first thermal bulb; 3-2, second expansion valve; 3-2A, second balance pipe; 3-2B, second thermal bulb; 4, evaporator; 4-1, first evaporator; 4-2, second evaporator; 4-3, third evaporator; 5, vapor-liquid separator; 5-1, first gas-liquid separator; 5-2, second gas-liquid separator; 6, evaporator fan; 7-1, first electromagnetic valve group; 7-2, second electromagnetic valve group; 8, air feeder; 10, first throttle valve; 11, second throttle valve; 12, unloading electromagnetic valve; 23, inner circulation air valve; 24, air supply regulation valve; 100, heat pump unit; 200, hot air cabinet; 210, air supply channel; 220, inner circulation air channel; 230, return air channel; 400, drying room; 500, control device; 510, operation parameter setting module; 520, drying room temperature and humidity monitoring module; 521, dry bulb temperature sensor; 522, wet bulb temperature sensor; 530, supply air temperature monitoring module; 531, outlet air temperature sensor; 540, air valve opening controller; 550, heat pump unit controller.

DETAILED DESCRIPTION OF THE INVENTION

Figure 1:
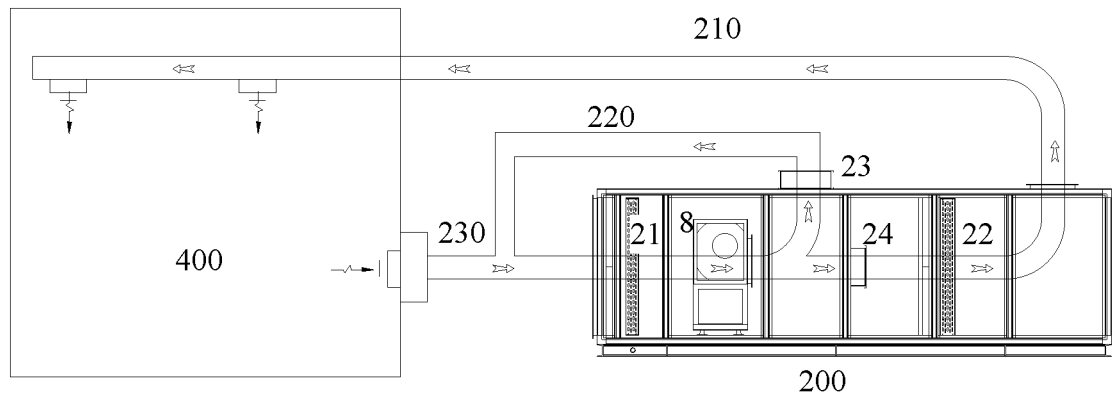
FIG. 1 is schematic diagram of a double-circulation structure of a heat pump-type double-circulation hot-air drying system.

For the sake of a better understanding of the above technical solutions of the invention, a further detailed description is given below with reference to the accompanying drawings and embodiments. FIG. 1 shows one embodiment of a heat pump-type double-circulation hot-air drying system of the invention. In this embodiment, the heat pump-type double-circulation hot-air drying system comprises a heat pump unit 100, a hot air cabinet 200, a drying room 400, and a control device 500 used for realizing control over the hot-air drying system by means of a micro-processor. As shown in FIG. 1, the heat pump-type double-circulation hot-air drying system further comprises a hot-air double-circulation loop which is composed of an air supply circulation loop and an inner circulation loop;

An air supply regulation valve 24 arranged inside the hot air cabinet 200 partitions the hot air cabinet 200 into a basic air temperature region and a reheating temperature-rise region;

A latent heat condenser 21 arranged in the basic air temperature region and a sensible heat condenser 22 arranged in the reheating temperature-rise region are connected in series through a refrigerant pipeline of the heat pump unit 100 to form a double-section series condenser; and a high-temperature gaseous refrigerant discharged out of a compressor first enters the sensible heat condenser 22 to be cooled by means of heat exchange and then enters the latent heat condenser 21;

The air supply circulation loop enters the hot air cabinet 200 via a return air channel 230 from the drying room 400, then enters an air feeder 8 via the latent heat condenser 21 arranged on an air inlet side of the basic air temperature region, then reaches the sensible heat condenser 22 in the reheating temperature-rise region via the air supply regulation valve 24, and finally returns into the drying room 400 via an air supply channel 210;

The inner circulation loop enters an inner circulation air channel 220 via an inner circulation air valve 23 from an exhaust port of the air feeder 8, then enters the hot air cabinet 200 via the return air channel 230 to reach the latent heat condenser 21 on the air inlet side of the basic air temperature region, and finally returns to a suction port of the air feeder 8; part of an airflow that enters the basic air temperature region from the drying room 400 returns into the return air channel 230 via the inner circulation air channel 220, is mixed with return air in the drying room, and is then delivered to the latent heat condenser 21, so that the inner circulation loop for large-volume air circulation is formed; and the other part of the airflow is delivered to the sensible heat condenser 22 via the air supply regulation valve 24 to carry out second heat exchange, and then enters the drying room 400 via the air supply channel 210, so that the air supply circulation loop for small-volume air circulation is formed. Latent heat in a refrigerant is gradually transferred, via the latent heat condenser 21, into the large-volume circulating air of the inner circulation loop, and the latent heat of condensation of the refrigerant is fully absorbed to improve the basic air temperature; the latent heat of the gaseous refrigerant at a temperature of 130° C. is discharged by the compressor and is transferred to the small-volume circulating air in the air supply circulation loop by means of second heat exchange of the sensible heat condenser 22; and the sensible heat condenser 22 can absorb about 30% of the heat energy of the system, so that the outlet air temperature of the hot air cabinet 200 reaches 90° C.

By controlling the degree of opening of the inner circulation air valve 23 and the air supply regulation valve 24, the control device 500 adjusts the circulation air volumes of the air supply circulation loop and the inner circulation loop, so as to control the outlet air temperature of the hot air cabinet 200.

Figure 2:
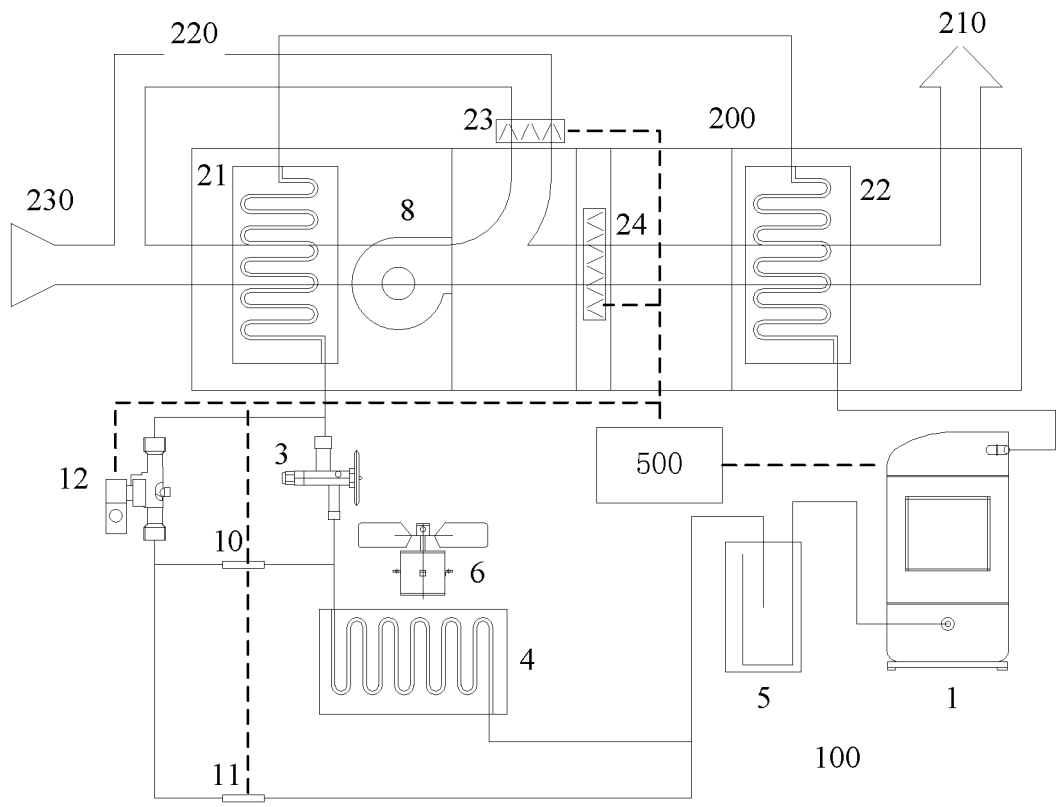
FIG. 2 is a schematic diagram of a heat pump unit of the heat pump-type double-circulation hot-air drying system.

According to an embodiment of the heat pump unit of the heat pump-type double-circulation hot-air drying system shown in FIG. 2, the heat pump unit 100 comprises a main circulation pipeline of the refrigerant, and a double-path unloading branch connected to the main circulation pipeline, wherein starting from an exhaust port of a compressor 1, the main circulation pipeline sequentially passes through the sensible heat condenser 22, the latent heat condenser 21, an expansion valve 3, an evaporator 4 and a vapor-liquid separator 5 to return to a suction port of the compressor 1; the double-path unloading branch is formed by connection of an unloading electromagnetic valve 12, a first throttle valve 10 and a second throttle valve 11; an inlet of the unloading electromagnetic valve 12 is connected in parallel to an outlet of a refrigerant pipeline of the latent heat condenser 21, an inlet of the first throttle valve 10 and an inlet of the second throttle valve 11 are connected in parallel to an outlet of the unloading electromagnetic valve 12, an outlet of the first throttle valve 10 is connected to an inlet of the evaporator 4, and an outlet of the second throttle valve 11 is connected to an inlet of the vapor-liquid separator 5; the control device 500 is connected to the first throttle valve 10, the second throttle valve 11 and the unloading electromagnetic valve 12; and the refrigerant circulation pipeline of the heat pump unit is dynamically changed according to the outlet air temperature, and the discharge temperature of the compressor 1 and the pressure of the high-temperature side are reduced by means of the double-path unloading branch, so that the double-circulation dynamic operation mode of the hot-air drying system is realized.

According to one embodiment of the heat pump-type double-circulation hot-air drying system, the double-circulation dynamic operation mode includes a single-circulation conventional heating mode, a double-circulation pressure reduction and unloading mode, a double-circulation temperature reduction and unloading mode, and a double-circulation double-path unloading mode, wherein:

In the single-circulation conventional heating mode, the unloading electromagnetic valve 12 is closed, and the refrigerant circulates along the main circulation pipeline; the inner circulation air valve 23 is opened by 0%, the air supply regulation valve 24 is opened by 100%, and the double-circulation hot-air drying system produces low-temperature hot air at an outlet air temperature below 45° C. by means of the air supply circulation loop; and the control device 500 controls the outlet air temperature by changing an operation interval or operation frequency of the compressor 1;

In the double-circulation pressure reduction and unloading mode, the unloading electromagnetic valve 12 and the second throttle valve 11 are opened, the first throttle valve 10 is closed, and part of the refrigerant is diverted by the unloading electromagnetic valve 12 to directly enter the vapor-liquid separator 5 via the second throttle valve 11 while the refrigerant circulates along the main circulation pipeline, so that the pressure of the high-pressure side is reduced; the inner circulation air valve 23 is opened by 50%-55%, and the air supply regulation valve 24 is opened by 50%-45%; and the control device 500 adjusts the circulation air volumes of the air supply circulation loop and the inner circulation loop to control the outlet air temperature, so that medium-temperature hot air having an outlet air temperature of 45-65° C. is produced;

In the double-circulation temperature reduction and unloading mode, the unloading electromagnetic valve 12 and the first throttle valve 10 are opened, the second throttle valve 11 is closed, and part of the refrigerant is diverted by the unloading electromagnetic valve 12 to enter the evaporator 4 via the first throttle valve 10 in parallel connection with the expansion valve 3 while the refrigerant circulates along the main circulation pipeline, so that the discharge temperature is reduced; the inner circulation air valve 23 is opened by 55%-65%, and the air supply regulation valve 24 is opened by 45%-35%; and the control device 500 adjusts the circulation air volumes of the air supply circulation loop and the inner circulation loop to control the outlet air temperature, so that medium high-temperature hot air having an outlet air temperature of 65-75° C. is produced;

In the double-circulation double-path unloading mode, the unloading electromagnetic valve 12, the first throttle valve 10 and the second throttle valve 11 are opened, and the refrigerant is diverted by the unloading electromagnetic valve 12 while circulating along the main circulation pipeline, so that part of the refrigerant enters the evaporator 4 via the first throttle valve 10 in parallel connection with the expansion valve 3, and the other part of the refrigerant directly enters the vapor-liquid separator 5 via the second throttle valve 11; the inner circulation air valve 23 is opened by 65%-75%, and the air supply regulation valve 24 is opened by 35%-25%; and the control device 500 adjusts the circulation air volumes of the air supply circulation loop and the inner circulation loop to control the outlet air temperature, so that high-temperature hot air having an outlet air temperature over 75° C. is produced.

Figure 3:
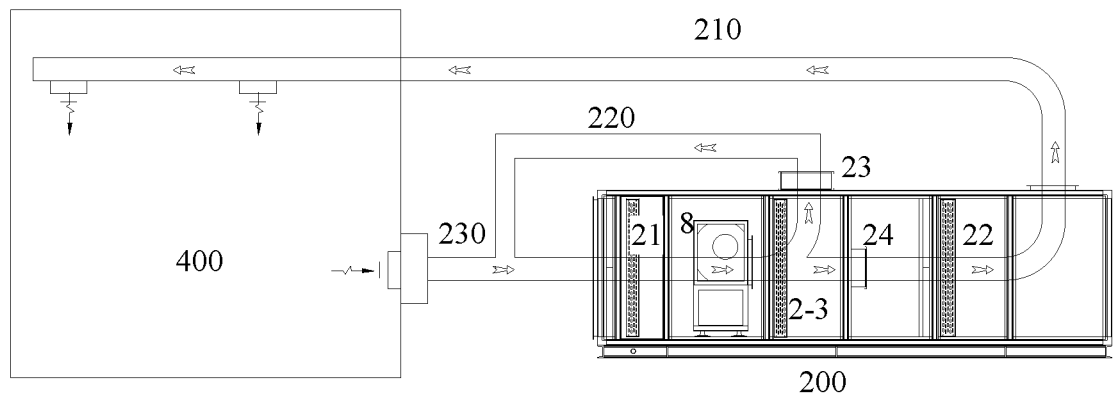
FIG. 3 is a schematic diagram of a constant-frequency variable-frequency double-circulation structure of the heat pump-type hot-air drying system.

To solve the problems of frequent starting and stopping and energy efficiency reduction of the unit caused by a large variation of the heat demand of the drying room in the drying process, in one embodiment of the heat pump-type hot-air drying system, the heat pump unit 100 further comprises a second refrigerant circulation pipeline adopting a variable-frequency compressor, wherein a third condenser 2-3 connected to the second refrigerant circulation pipeline is arranged in the hot air cabinet 200 and is located on an air outlet side of the basic air temperature region, as shown in FIG. 3; when the heat demand of the drying room is less than 40%, a constant-frequency compressor is stopped, a variable-frequency compressor is started, and the heat pump-type hot-air drying system operates in a conventional variable-frequency heat pump mode; when the heat demand of the drying room is equal to or greater than 40%, the constant-frequency compressor and the variable-frequency compressor are synchronously started, and the heat pump-type hot-air drying system operates in a constant-frequency and variable-frequency double-compressor parallel operation mode; when a set temperature of supply air is higher than 75° C., the heat pump-type hot-air drying system operates in a double-circulation double-path unloading mode, and the latent heat condenser 21, the third condenser 2-3 and the sensible heat condenser 22 form a three-level heat exchange structure of the hot air cabinet 200; and circulating air of the inner circulation loop passes through the latent heat condenser 21 and the third condenser 2-3 to carry out heat exchange twice, so that the basic air temperature of the basic air temperature region is further improved, and the outlet air temperature of the hot air cabinet 200 is improved over 75° C.

Figure 4:
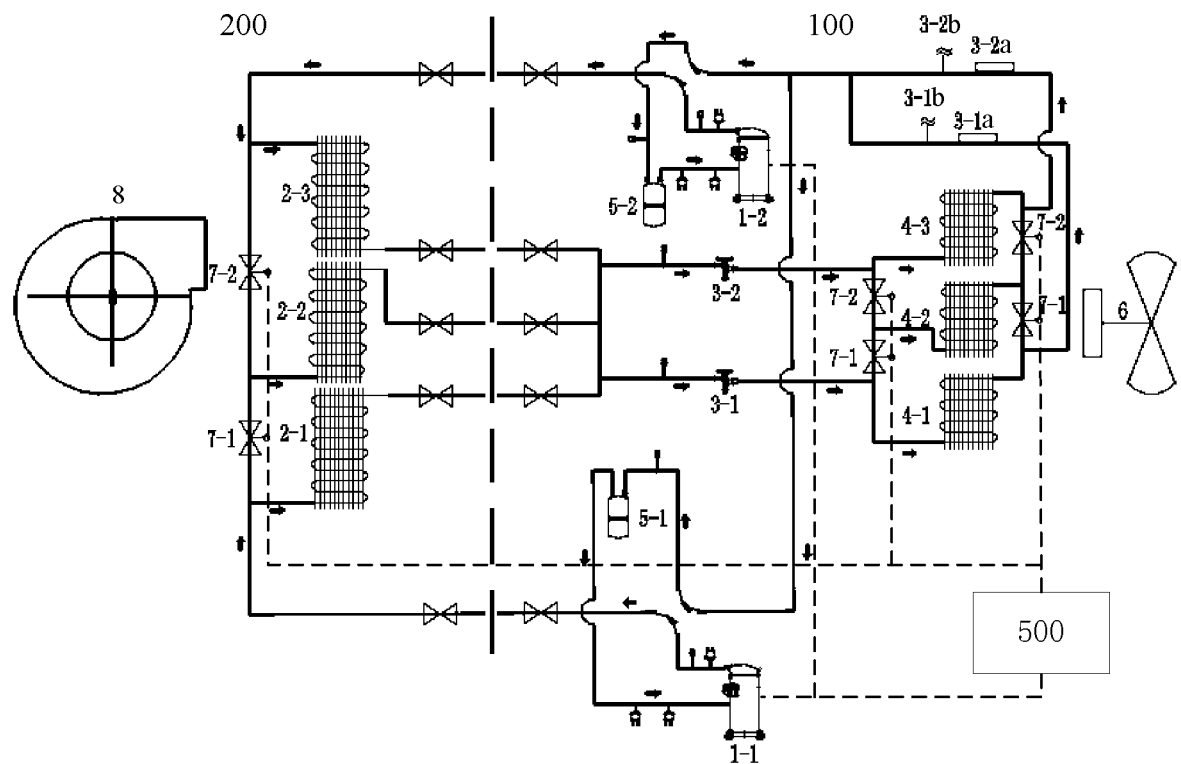
FIG. 4 is a schematic diagram of a heat pump unit of a variable-frequency variable-capacity heat pump-type hot-air drying system.

According to one embodiment of the heat pump unit of the variable-frequency and variable-capacity heat pump-type hot-air drying system shown in FIG. 4, the heat pump unit 100 comprises a constant-frequency compressor 1-1, a variable-frequency compressor 1-2, a constant-frequency circulation pipeline, a variable-frequency circulation pipeline in parallel connection with the constant-frequency circulation pipeline, and a heat exchanger variable-capacity branch formed by means of control over a switch state of the first electromagnetic valve group 7-1 and the second electromagnetic valve group 7-2 with the control device 500

Starting from an exhaust port of the constant-frequency compressor 1-1, the constant-frequency circulation pipeline sequentially passes through a first condenser 2-1, a first expansion valve 3-1, a first evaporator 4-1 and a first gas-liquid separator 5-1 to return to a suction port of the constant-frequency compressor 1-1;

Starting from an exhaust port of the variable-frequency compressor 1-2, the variable-frequency circulation pipeline sequentially passes through a third condenser 2-3, a second expansion valve 3-2, a third evaporator 4-3 and a second gas-liquid separator 5-2 to return to a suction port of the variable-frequency compressor 1-2;

The heat exchanger variable-capacity branch comprises a second condenser 2-2 and a second evaporator 4-2, wherein the second condenser 2-2 is connected in parallel to the first condenser 2-1 via the first electromagnetic valve group 7-1 and is connected in parallel to the third condenser 2-3 via the second electromagnetic valve group 7-2; the second evaporator 4-2 is connected in parallel to the first evaporator 4-1 via the first electromagnetic valve group 7-1 and is connected in parallel to the third evaporator 4-3 via the second electromagnetic valve group 7-2;

The control device 500 is connected to the first electromagnetic valve group 7-1 and the second electromagnetic valve group 7-2, and by means of control over a switch state of the first electromagnetic valve group 7-1 and the second electromagnetic valve group 7-2, the connection mode of the heat exchanger variable-capacity branch is changed to control the heat pump-type hot-air drying system to enter into a double-compressor variable-capacity operation mode; and the control device 500 controls the operation frequency of the variable-frequency compressor 1-2 according to a set outlet air temperature. According to the variable-frequency variable-capacity heat pump-type hot-air drying system, the heat exchange area of a heat exchanger (including an evaporator and a condenser) is enlarged by means of the variable-capacity operation mode, so that the overall heat exchange effect of the heat pump unit 100 is obviously improved, and the energy efficiency of the system is improved.

According to one embodiment of the variable-frequency variable-capacity heat pump-type hot-air drying system, the double-compressor variable-capacity operation mode includes a variable-frequency and constant-capacity mode, a variable-frequency variable-capacity mode, a constant-frequency variable-capacity and variable-frequency constant-capacity parallel operation mode, a variable-frequency and constant-capacity and variable-frequency variable-capacity parallel operation mode, and a constant-frequency constant-capacity and variable-frequency variable-capacity parallel operation mode, wherein:

In the variable-frequency and constant-capacity mode, the variable-frequency compressor 1-2 is started, the refrigerant circulates along the variable-frequency circulation pipeline, and the first electromagnetic valve group 7-1 and the second electromagnetic valve group 7-2 are both closed;

In variable-frequency variable-capacity mode, the variable-frequency compressor 1-2 is started, and the refrigerant circulates along the variable-frequency circulation pipeline; and the first electromagnetic valve group 7-1 is closed, the second electromagnetic valve group 7-2 is opened, the heat exchanger variable-capacity branch is connected in parallel to the variable-frequency circulation pipeline, and the variable-frequency compressor 1-2 enters into a variable-capacity operation mode;

In constant-frequency variable-capacity and variable-frequency constant-capacity parallel operation mode, the constant-frequency compressor 1-1 and the variable-frequency compressor 1-2 are synchronously started, and the refrigerant circulates along the constant-frequency circulation pipeline and the variable-frequency circulation pipeline; and the first electromagnetic valve group 7-1 is opened, the second electromagnetic valve group 7-2 is closed, the heat exchanger variable-capacity branch is connected in parallel to the constant-frequency circulation pipeline, and the constant-frequency compressor 1-1 enters into the variable-capacity operation mode;

In the constant-frequency constant-capacity and variable-frequency variable-capacity parallel operation mode, the constant-frequency compressor 1-1 and the variable-frequency compressor 1-2 are synchronously started, and the refrigerant circulates along the constant-frequency circulation pipeline and the variable-frequency circulation pipeline; and the first electromagnetic valve group 7-1 is closed, the second electromagnetic valve group 7-2 is opened, the heat exchanger variable-capacity branch is connected in parallel to the variable-frequency circulation pipeline, and the variable-frequency compressor 1-2 enters into the variable-capacity operation mode.

According to a preferred embodiment of the heat pump-type hot-air drying system requiring a higher drying temperature, the hot air cabinet 200 is partitioned by an air supply regulation valve 24 into a basic air temperature region and a reheating temperature-rise region, wherein a refrigerant pipeline of the first condenser 2-1 and a refrigerant pipeline of the second condenser 2-2 are connected in series to form a double-section series condenser; the first condenser 2-1 is used as a sensible heat condenser and is arranged in the reheating temperature-rise region; the second condenser 2-2 is used as a latent heat condenser and is arranged on an air inlet side of the basic air temperature region, and the third condenser 2-3 is arranged on an air outlet side of the basic air temperature region; the hot air cabinet 200 is provided with an inner circulation loop communicated with the basic air temperature region, as shown in FIG. 3; and by means of the second heat exchange of hot air output by the heat pump-type hot-air drying system performed by the inner circulation loop and the air supply circulation loop, the outlet air temperature of the hot air cabinet 200 can reach 90° C.

Figure 5:
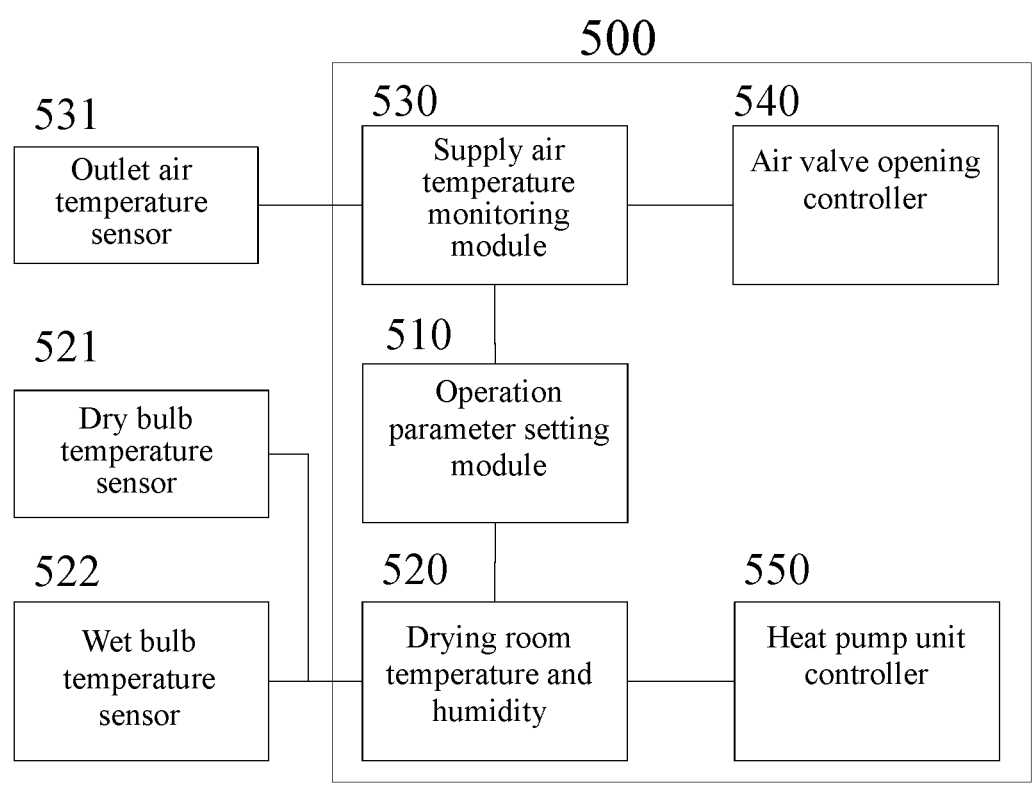
FIG. 5 is a schematic diagram of a control device of the variable-frequency variable-capacity heat pump-type hot-air drying system.

According to one embodiment of the control device 500 of the variable-frequency variable-capacity heat pump-type hot-air drying system shown in FIG. 5, the control device 500 comprises an operation parameter setting module 510, a drying room temperature and humidity monitoring module 520, a supply air temperature monitoring module 530, an air valve opening controller 540, and a heat pump unit controller 550, wherein the operation parameter setting module 510 is used for configuring a temperature control parameter and saving a preset temperature control curve parameter; the drying room temperature and humidity monitoring module 520 and the supply air temperature monitoring module 530 are used for detecting and monitoring the temperature and humidity of the drying room, and the outlet air temperature; the air valve opening controller 540 is used for driving the air valve; the heat pump unit controller 550 is used for controlling compressors and the electromagnetic valves; an input terminal of the drying room temperature and humidity monitoring module 520 is connected to the operation parameter setting module 510, a dry bulb temperature sensor 521 and a wet bulb temperature sensor 522; an output terminal of the drying room temperature and humidity monitoring module 520 is connected to the heat pump unit controller 550; an output terminal of the heat pump unit controller 550 is connected to the compressor and a control electromagnetic valve in the refrigerant pipeline; an input terminal of the supply air temperature monitoring module 530 is connected to the operation parameter setting module 510 and an outlet air temperature sensor 531; an output terminal of the supply air temperature monitoring module 530 is connected to the air valve opening controller 540; and an output terminal of the air valve opening controller 540 is connected to the inner circulation air valve 23 and the air supply regulation valve 24. The control electromagnetic valve comprises an unloading electromagnetic valve 12, a first throttle valve 10, a second throttle valve 11, a first electromagnetic valve group 7-1 and a second electromagnetic valve group 7-2.

According to one embodiment of the variable-frequency and variable-capacity heat pump-type hot-air drying system, the control device 500 uses a single-chip micro-processor having a multi-path A/D conversion interface and a multi-path PWM output interface to realize program control, and the operation parameter setting module 510, the drying room temperature and humidity monitoring module 520 and the supply air temperature monitoring module 530 are functional software modules provided by the micro-processor; the dry bulb temperature sensor 521, the outlet air temperature sensor 531 and the wet bulb temperature sensor 522 are connected to the single-chip micro-processor via the A/D conversion interface of the micro-processor; the control device 500 provides an air valve opening control output signal for the air valve opening controller 540 by means of a PWM output of the micro-processor and provides an output signal for variable-frequency control of the variable-frequency compressor and a variable-frequency fan by means of the heat pump unit controller 550; and the control device 500 outputs switch signals to the compressors and the electromagnetic valves by programming via a PIO interface of the micro-processor, and the heat pump unit controller 550 controls the switch state of the compressors and the electromagnetic valves in the system.

Figure 6:
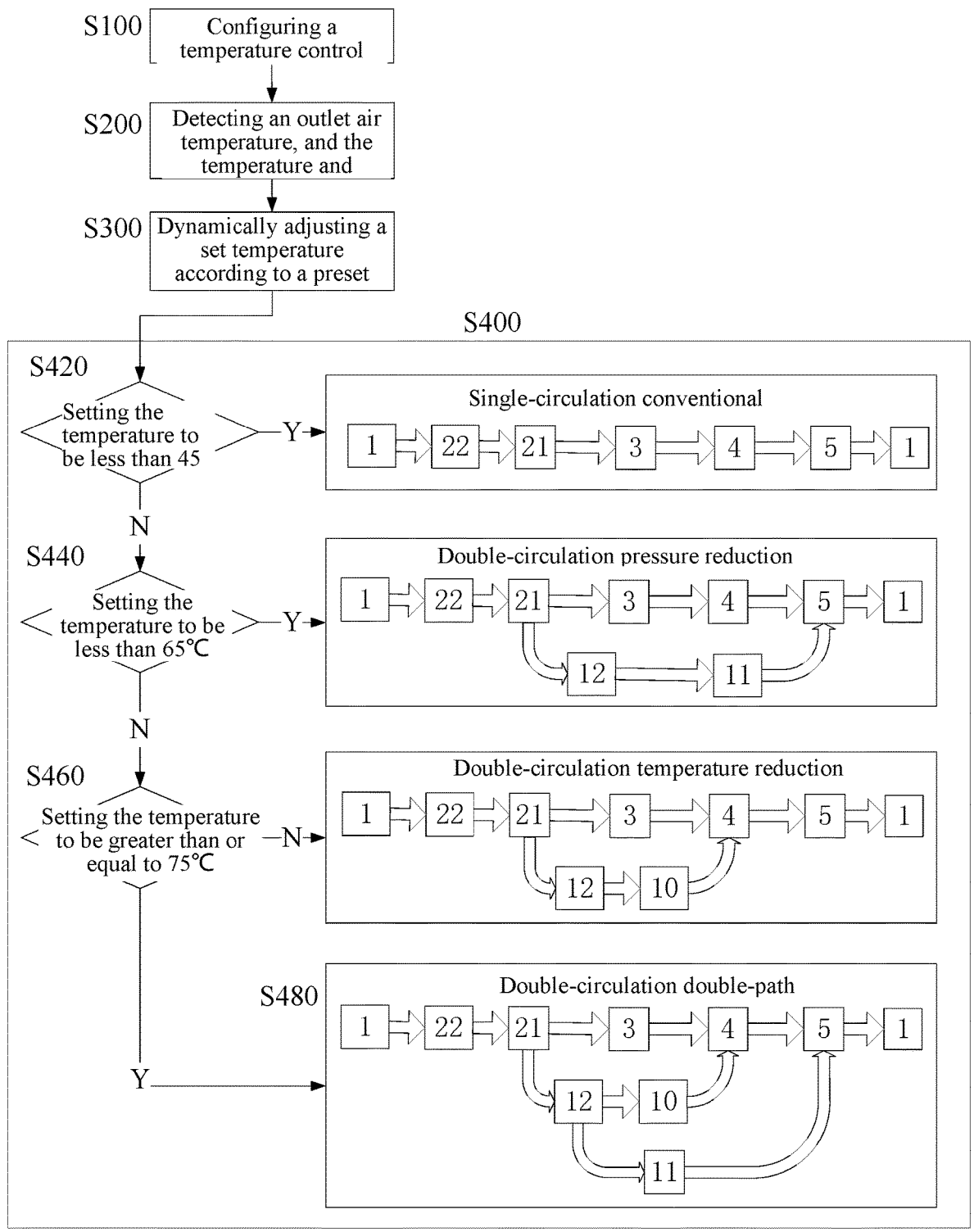
FIG. 6 is a flow diagram of a control method for the heat pump-type double-circulation hot-air drying system.

As shown in FIG. 6, in one embodiment of a control method for the heat pump-type double-circulation hot-air drying system, the control method comprises the following steps:

S100: a temperature control parameter is configured, and a preset temperature control curve parameter is saved;

S200: an outlet air temperature, and the temperature and humidity of a drying room are detected and monitored;

S300: a set temperature is dynamically adjusted to a preset temperature control curve; and S400: a double-circulation dynamic operation mode of a system is selected according to a current set temperature.

Embodiment 1

Figure 8:
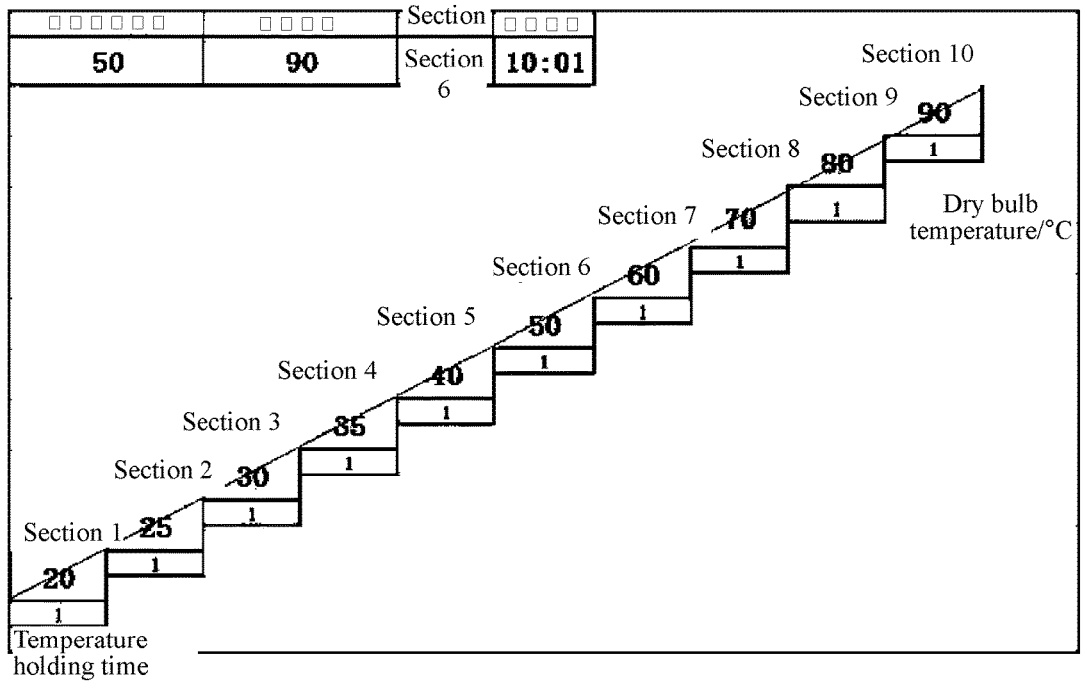
FIG. 8 is a schematic diagram of a multi-section temperature control curve and a temperature control parameter configuration interface.

FIG. 8 shows one embodiment of a multi-section temperature control curve and a temperature control parameter configuration interface. In this embodiment, the multi-section temperature control curve is a ten-section heating curve, and the control device 500 configures set temperatures and temperature holding times of these time periods to control the double-circulation hot-air drying system to fulfill fully-automatic intelligent operation without manual control.

According to the embodiment of the control method for the heat pump-type double-circulation hot-air drying system shown in FIG. 6, S400 comprises the following control and operation steps:

S420: if the set temperature is less than 45° C., the unloading electromagnetic valve 12 is closed, and the system enters into a single-circulation conventional heating mode, wherein in this mode, the inner circulation air valve 23 is opened by 0%, and the air supply regulation valve 24 is opened by 100%; the operation interval or operation frequency of the compressor 1 is controlled according to the outlet air temperature; and in this step, the temperature control range corresponds to sections 1-5 of the ten-section heating curve shown in FIG. 8, and the outlet air temperature is set to 20° C., 25° C., 30° C., 35° C. and 40° C. respectively in the five sections;

S440: if the set temperature is less than 65° C., the unloading electromagnetic valve 12 and the second throttle valve 11 are opened, the first throttle valve 10 is closed, and the system enters into a double-circulation pressure reduction and unloading mode; the circulation air volumes of the air supply circulation loop and the inner circulation loop are adjusted to control the outlet air temperature; in this mode, the inner circulation air valve 23 is opened by 40%-60%, and the air supply regulation valve 24 is opened by 60%-40%; and the temperature control range in this step corresponds to section 6 and section 7 of the ten-section heating curve shown in FIG. 8, and in the two sections, the outlet air temperature is set to 50° C. and 60° C. respectively, correspondingly, the inner circulation air valve 23 is opened by 50% and 55% respectively, and the air supply regulation valve 24 is opened by 50% and 45% respectively;

S460: if the set temperature is greater than or equal to 75° C., S480 is executed; or otherwise, the unloading electromagnetic valve 12 and the second throttle valve 11 are opened, the first throttle valve 10 is closed, and the system enters into a double-circulation temperature reduction and unloading mode; the circulation air volumes of the air supply circulation loop and the inner circulation loop are adjusted to control the outlet air temperature; in this mode, the inner circulation air valve 23 is opened by 55%-65%, and the air supply regulation valve 24 is opened by 45%-35%; and the temperature control range in this step corresponds to section 8 of the ten-section heating curve shown in FIG. 8, the outlet air temperature is set to 70° C., and correspondingly, the inner circulation air valve 23 is opened by 60%, and the air supply regulation valve 24 is opened by 40%;

S480: the unloading electromagnetic valve 12, the first throttle valve 10 and the second throttle valve 11 are opened, and the system enters into a double-circulation double-path unloading mode; the circulation air volumes of the air supply circulation loop and the inner circulation loop are adjusted to control the outlet air temperature; in this mode, the inner circulation air valve 23 is opened by 60-80%, and the air supply regulation valve 24 is opened by 40-20%; and the temperature control range in this step corresponds to section 9 and section 10 of the ten-section heating curve shown in FIG. 8, and in the two sections, the outlet air temperature is set to 80° C. and 90° C. respectively, correspondingly, the inner circulation air valve 23 is opened by 65% and 75% respectively, and the air supply regulation valve 24 is opened by 35% and 25% respectively.

Embodiment 2

Figure 9:
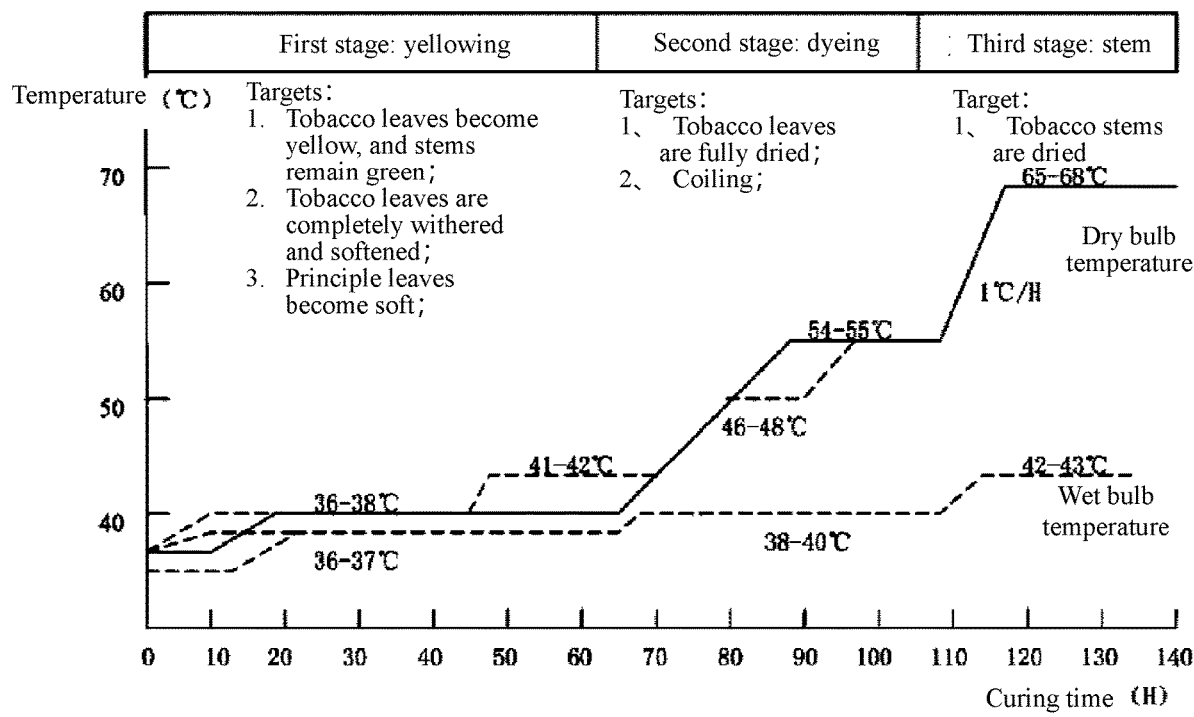
FIG. 9 is a multi-section drying process diagram of tobacco of some varieties.
Figure 10:
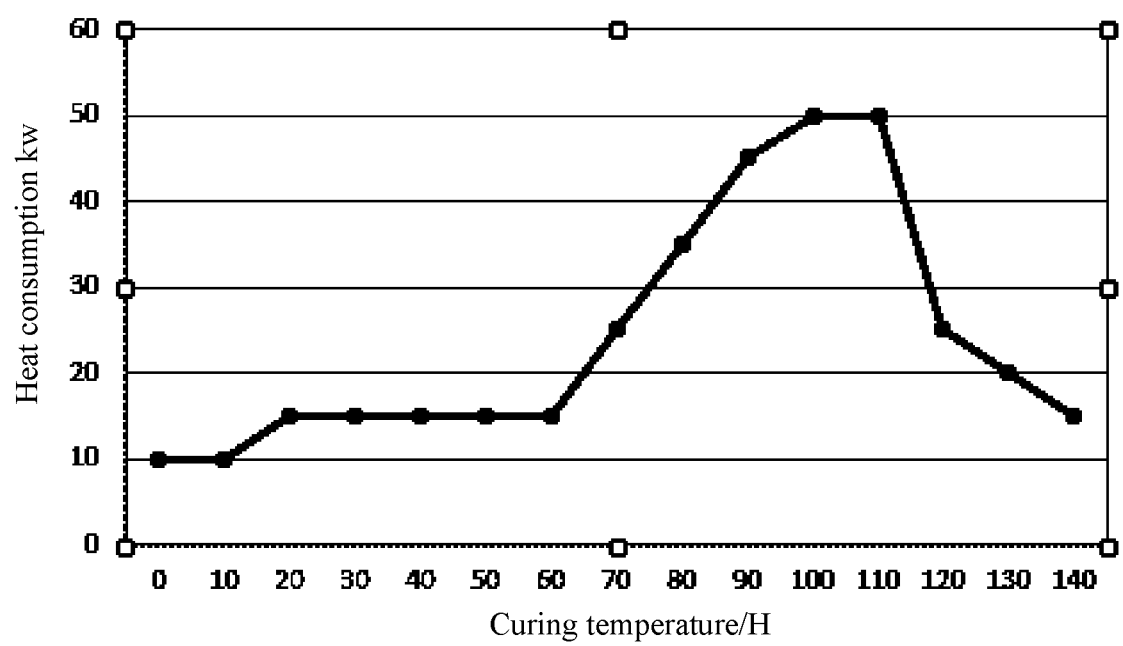
FIG. 10 is a curve chart of heat consumption in different time periods of the tobacco curing process.

A 8*2.8*2.2 m tobacco drying room can dry 350 bundles of tobacco every time, and each bundle includes 30 kg of tobacco, so that totally 10,500 kg of tobacco can be dried every time. The variable-frequency and variable-capacity heat pump-type hot-air drying system is formed by parallel connection of a 6 P constant-frequency compressor 1-1 and a 6 P variable-frequency compressor 1-2 and has the maximum heating capacity of 50 kW. FIG. 4 shows the variable-frequency variable-capacity connection structure of the unit. The multi-section drying process diagram in FIG. 9 shows the temperature control curve in the tobacco drying process. FIG. 10 shows the heat consumption in all time periods. The control device 500 selects the proper operation mode by contrastive analysis so as to reach the maximum operation efficiency.

Figure 7:
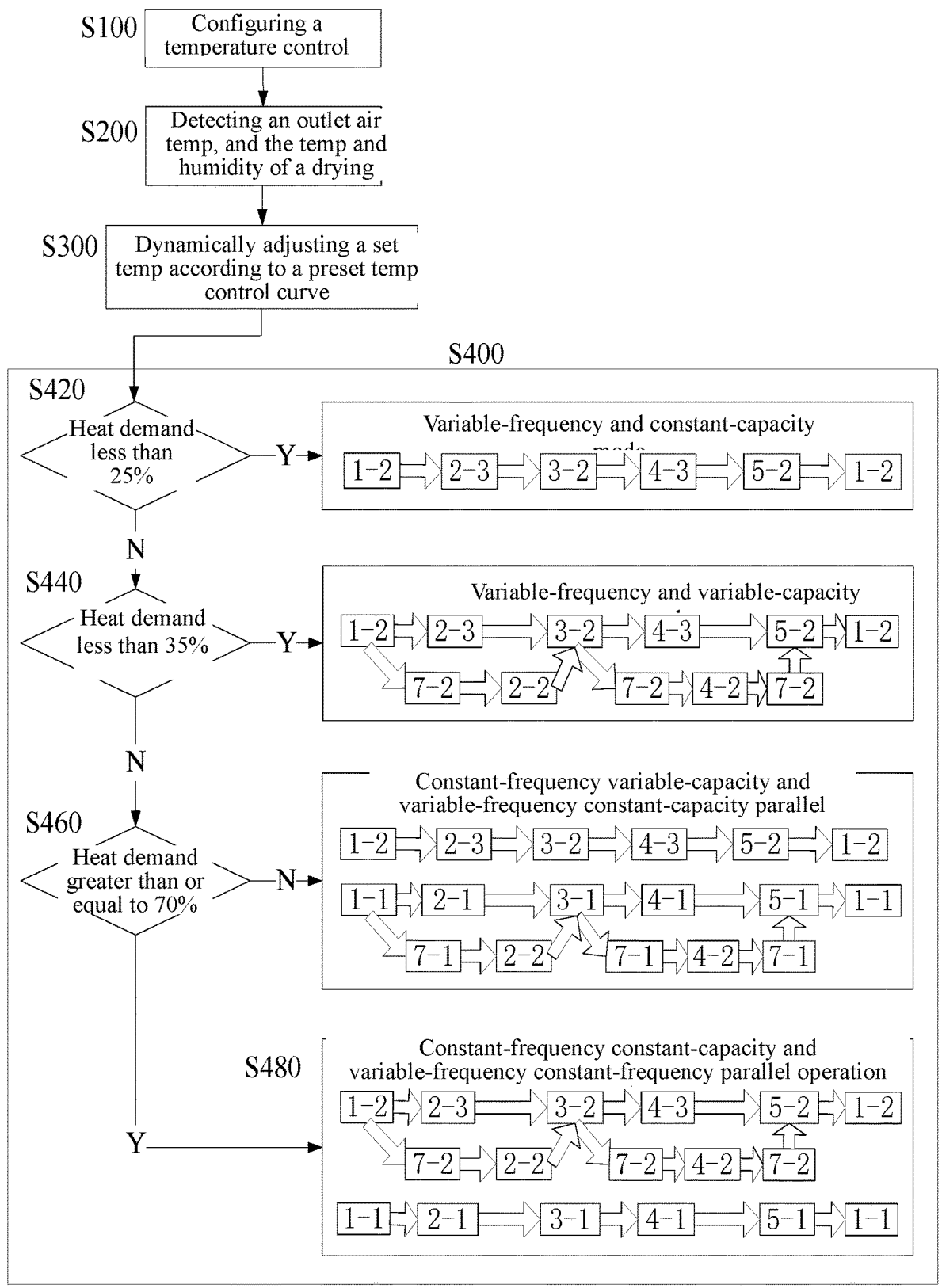
FIG. 7 is a flow diagram of a control method for the variable-frequency variable-capacity heat pump-type hot-air drying system.

According to an embodiment of the control method for the variable-frequency variable-capacity heat pump-type hot-air drying system shown in FIG. 7, in S300, the heat demand in a current time period is dynamically set according to the preset temperature control curve. In this embodiment, the heat demand is represented by the ratio of the heat consumption in unit time of the drying room in the current time period to the maximum heating capacity of the heat pump unit;

In S400, the double-unit variable-capacity operation mode of the system is selected according to the heat demand in the current time period, and S400 comprises the following control and operation steps:

S420: if the heat demand is less than 25%, the variable-frequency compressor 1-2 is started, the first electromagnetic valve group 7-1 and the second electromagnetic valve group 7-2 are closed, and the system enters into a variable-frequency and constant-capacity mode; in this step, the temperature control range corresponds to the first half part of the tobacco drying-yellowing stage shown in FIG. 9; as shown in FIG. 10, the curing time is 0-10 h, and the heat consumption of the drying room is 10 kw; the variable-frequency compressor 1-2 operates at a frequency of 20 Hz;

S440: if the heat demand is less than 35%, the variable-frequency compressor 1-2 is started, the first electromagnetic valve group 7-1 is closed, the second electromagnetic valve group 7-2 is opened, and the system enters a variable-frequency variable-capacity mode; in this step, the temperature control range corresponds to the second half part of the tobacco drying-yellowing stage shown in FIG. 9; as shown in FIG. 10, the curing time is 10-60 h, and the heat consumption of the drying room is 15 kw; and the variable-frequency compressor 1-2 operates at a frequency of 30 Hz; in the first tobacco stage (yellowing stage) of tobacco drying, the temperature in the drying room should be maintained between 35° C. and 38° C., the load is small in this case, and the requirement for tobacco yellowing can be met in this mode;

S460: if the heat demand is greater than or equal to 70%, S480 is executed; or otherwise, the constant-frequency compressor 1-1 and the variable-frequency compressor 1-2 are synchronously started, the first electromagnetic valve group 7-1 is opened, the second electromagnetic valve group 7-2 is closed, and the system enters a constant-frequency variable-capacity and variable-frequency constant-capacity parallel operation mode; in this step, the temperature control range corresponds to the tobacco drying-dyeing stage shown in FIG. 9, the curing time is 60-80 h as shown in FIG. 10, the heat consumption of the drying room is 15-35 kw, and the capacity of the condenser and the evaporator of the constant-frequency compressor 1-1 is improved to obtain the maximum the heating capacity; the variable-frequency compressor 1-2 operates at a frequency of 30-50 Hz;

S480: the constant-frequency compressor 1-1 and the variable-frequency compressor 1-2 are synchronously started, the first electromagnetic valve group 7-1 is closed, the second electromagnetic valve group 7-2 is opened, and the system enters into a constant-frequency constant-capacity and variable-frequency variable-capacity parallel operation mode; in this step, the temperature control range corresponds to the first half part of the tobacco drying-dyeing stage and the stem-drying stage shown in FIG. 9, the curing time is 80-120 h as shown in FIG. 10, the heat consumption of the drying room is 35-50 kw, the outlet air temperature is controlled to 65-68° C., and the wet bulb temperature is controlled to 40-43° C.; after curing, the leaf water content shall be within 5%-6%, and the vein water content should be within 7%-8%; and the variable-frequency compressor 1-2 operates at a frequency of 50-100 Hz, and the heat demand for tobacco drying can be met under the maximum load condition. In this case, the constant-frequency compressor 1-1 operates normally to improve the overall heat exchange capacity. Double-system parallel operation overcomes the defect that traditional drying units have to adopt electric heating to obtain a high outlet air temperature, and greatly improves the operating energy efficiency of the system.

Those ordinarily skilled in this field would appreciate that the above embodiments are only used for illustrating the technical solutions of the invention, and are not for limiting the invention. Any variations and transformations of the above embodiments made based on the essential spirit of the invention should also fall within the protection scope of the claims of the invention.

What is claimed is:

1. A method for controlling a heat pump-type double-circulation hot-air drying system, comprising the following steps:
   i) setting a temperature control parameter as a preset temperature control curve parameter;
   ii) detecting and monitoring an outlet air temperature, and a temperature and humidity of a drying room;
   iii) dynamically adjusting a set temperature according to a preset temperature control curve; and
   iv) selecting, according to a current set temperature, a double-circulation dynamic operation mode of the heat pump-type double-circulation hot-air drying system;
   wherein, the heat pump-type double-circulation hot-air drying system comprises a hot-air double-circulation loop, an air supply regulation valve, an inner circulation air valve, a latent heat condenser, a sensible heat condenser, and a double-path unloading branch, wherein the hot-air double-circulation loop is composed of an air supply circulation loop and an inner circulation loop; the air supply regulation valve and the inner circulation air valve are used for adjusting a circulation air volume of the hot-air double-circulation loop; the latent heat condenser and the sensible heat condenser are connected in series to a main circulation pipeline of a refrigerant; the double-path unloading branch is formed by connection of an unloading electromagnetic valve, a first throttle valve and a second throttle valve;
   the double-circulation dynamic operation mode is selected from the group consisting of a single-circulation conventional heating mode, a double-circulation pressure reduction and unloading mode, a double-circulation temperature reduction and unloading mode, and a double-circulation double-path unloading mode, wherein:
   in the single-circulation conventional heating mode, the unloading electromagnetic valve is closed, and the refrigerant circulates along the main circulation pipeline; the inner circulation air valve is opened by 0%, the air supply regulation valve is opened by 100%, and the double-circulation hot-air drying system produces low-temperature hot air at an outlet air temperature below 45° C. by the air supply circulation loop; and a control device controls the outlet air temperature by changing an operation interval or operation frequency of a compressor;
   in the double-circulation pressure reduction and unloading mode, the unloading electromagnetic valve and the second throttle valve are opened, the first throttle valve is closed, and part of the refrigerant is diverted by the unloading electromagnetic valve to directly enter a vapor-liquid separator via the second throttle valve while the refrigerant circulates along the main circulation pipeline; the inner circulation air valve is opened by 50%-55%, and the air supply regulation valve is opened by 50%-45%; and the control device adjusts circulation air volumes of the air supply circulation loop and the inner circulation loop to control the outlet air temperature, so that medium-temperature hot air having an outlet air temperature of 45-65° C. is produced;
   in the double-circulation temperature reduction and unloading mode, the unloading electromagnetic valve and the first throttle valve are opened, the second throttle valve is closed, and part of the refrigerant is diverted by the unloading electromagnetic valve to enter an evaporator via the first throttle valve in parallel connection with an expansion valve while the refrigerant circulates along the main circulation pipeline; the inner circulation air valve is opened by 55%-65%, and the air supply regulation valve is opened by 45%-35%; and the control devices adjusts the circulation air volumes of the air supply circulation loop and the inner circulation loop to control the outlet air temperature, so that medium high-temperature hot air having an outlet air temperature of 65-75° C. is produced;
   in the double-circulation double-path unloading mode, the unloading electromagnetic valve, the first throttle valve and the second throttle valve are opened, and the refrigerant is diverted by the unloading electromagnetic valve while circulating along the main circulation pipeline, partial of the refrigerant enters the evaporator via the first throttle valve in parallel connection with the expansion valve, and remaining of the refrigerant directly enters the vapor-liquid separator via the second throttle valve; the inner circulation air valve is opened by 65%-75%, and the air supply regulation valve is opened by 35%-25%; and the control device adjusts the circulation air volumes of the air supply circulation loop and the inner circulation loop to control the outlet air temperature, so that high-temperature hot air having an outlet air temperature over 75° C. is produced.

2. The method according to claim 1, wherein in step iv) comprises the following control and operation steps:
   a) the heat pump-type double-circulation hot-air drying system enters into a variable-frequency and constant-capacity mode when a heat demand is less than 25%, starting a variable-frequency compressor, and closing a first electromagnetic valve group and a second electromagnetic valve group;
   b) the heat pump-type double-circulation hot-air drying system enters into a variable-frequency variable-capacity mode when the heat demand is greater than 25% and less than 35%, starting the variable-frequency compressor, closing the first electromagnetic valve group, and opening the second electromagnetic valve group;

c) the heat pump-type double-circulation hot-air drying system enters into a constant-frequency variable-capacity and variable-frequency constant-capacity parallel operation mode when the heat demand is greater than 35% and less than 70%, starting a constant-frequency compressor and the variable-frequency compressor, opening the first electromagnetic valve group, and closing the second electromagnetic valve group; and d) the heat pump-type double-circulation hot-air drying system enters into a constant-frequency constant-capacity and variable-frequency variable-capacity parallel operation mode when the heat demand is greater than or equal to 70%, starting the constant-frequency compressor and the variable-frequency compressor, closing the first electromagnetic valve group, and opening the second electromagnetic valve group.

3. A heat pump-type hot-air drying system control device used for implementing the method of claim 1, comprising an operation parameter setting module, a drying room temperature and humidity monitoring module, a supply air temperature monitoring module, an air valve opening controller, and a heat pump unit controller, wherein the operation parameter setting module is used for setting the temperature control parameter and storing the preset temperature control curve parameter; the drying room temperature and humidity monitoring module and the supply air temperature monitoring module are used for detecting and monitoring the temperature and humidity of the drying room, and the outlet air temperature; the air valve opening controller is used for driving the air valve; the heat pump unit controller is used for controlling the compressors and the electromagnetic valves; an input terminal of the drying room temperature and humidity monitoring module is connected to the operation parameter setting module, a dry bulb temperature sensor and a wet bulb temperature sensor; an output terminal of the drying room temperature and humidity monitoring module is connected to the heat pump unit controller; an output terminal of the heat pump unit controller is connected to the compressors and a control electromagnetic valve in a refrigerant pipeline; an input terminal of the supply air temperature monitoring module is connected to the operation parameter setting module and an outlet air temperature sensor; an output terminal of the supply air temperature monitoring module is connected to the air valve opening controller; and an output terminal of the air valve opening controller is connected to the inner circulation air valve and the air supply regulation valve.

4. The heat pump-type hot-air drying system control device according to claim 3, wherein the control device comprises a single-chip micro-processor having a multi-path A/D (Analogue to Digital) conversion interface and a multi-path PWM (Pulse Width Modulation) output interface to realize program control, and the operation parameter setting module, the drying room temperature and humidity monitoring module and the supply air temperature monitoring module are functional software modules provided by the single-chip micro-processor; the dry bulb temperature sensor, the outlet air temperature sensor and the wet bulb temperature sensor are connected to the single-chip micro-processor via the A/D conversion interface of the single-chip micro-processor; the control device provides an air valve opening control output signal for the air valve opening controller by a PWM output of the single-chip micro-processor and provides an output signal for variable-frequency control of the variable-frequency compressor and a variable-frequency fan by the heat pump unit controller; and the control device outputs switch signals to the compressors and the electromagnetic valves by programming via a PIO (Programmed Input/Output) interface of the single-chip micro-processor, and the heat pump unit controller controls a switch state of the compressors and the electromagnetic valves in the heat pump-type double-circulation hot-air drying system.

* * * * *